United States Patent [19]
Funahashi

[11] Patent Number: 6,125,241
[45] Date of Patent: *Sep. 26, 2000

[54] CAMERA

[75] Inventor: Akira Funahashi, Sakai, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/312,074

[22] Filed: Sep. 26, 1994

Related U.S. Application Data

[63] Continuation of application No. 08/051,344, Apr. 23, 1993, abandoned.

[30] Foreign Application Priority Data

Apr. 27, 1992 [JP] Japan .................................. 4-136161

[51] Int. Cl.[7] ................................................ G03B 17/24
[52] U.S. Cl. .......................... 396/387; 396/416; 396/535
[58] Field of Search ............................ 354/170, 173.1, 354/212, 214, 288, 105, 106, 173.11, 219, 222; 396/319, 320, 348, 349, 350, 373, 377, 379, 383, 387, 411, 416, 418, 535

[56] References Cited

U.S. PATENT DOCUMENTS

| | | | |
|---|---|---|---|
| 4,152,059 | 5/1979 | Hennig et al. | 396/387 |
| 4,419,000 | 12/1983 | Yoshida et al. | 354/173.1 |
| 4,728,978 | 3/1988 | Inoue et al. | 354/289.1 |
| 4,816,853 | 3/1989 | Kikukawa et al. | 354/412 |
| 4,829,528 | 5/1989 | Tanaka et al. | 354/173.1 |
| 4,870,437 | 9/1989 | Omaki et al. | 354/64 |
| 4,992,812 | 2/1991 | Smart | 354/212 |
| 5,008,693 | 4/1991 | Hirohata | 354/214 |
| 5,119,119 | 6/1992 | Hamano et al. | 354/106 |
| 5,150,140 | 9/1992 | Kitazawa | 354/195.1 |
| 5,155,513 | 10/1992 | Matsumura et al. | 354/106 |
| 5,221,939 | 6/1993 | Taniguichi et al. | 354/173.1 |
| 5,349,408 | 9/1994 | Nomupa et al. | 354/195.1 |
| 5,543,875 | 8/1996 | Machida et al. | 396/373 |
| 5,555,045 | 9/1996 | Tsujimoto et al. | 396/319 |

FOREIGN PATENT DOCUMENTS

| | | |
|---|---|---|
| 0 353 750 | 2/1990 | European Pat. Off. . |
| 0433019 | 6/1991 | European Pat. Off. . |
| 4-68333 | 4/1992 | Japan . |

*Primary Examiner*—Safet Metjahic
*Assistant Examiner*—Michael Dalakis
*Attorney, Agent, or Firm*—Burns, Doane, Swecker & Mathis, LLP

[57] ABSTRACT

A camera has a transmitting mechanism, for transmitting a driving force necessary for camera operation, that is provided behind a path for feeding a film. The camera has a cartridge chamber wherein a film cartridge is loaded, and the film cartridge is loaded in the cartridge chamber in a direction parallel to the orientation of its shaft. The transmitting mechanism may be provided behind an exposure aperture through which light flux from an object is projected onto a film.

30 Claims, 3 Drawing Sheets

CAMERA

This application is a continuation of application Ser. No. 08/051,344, filed Apr. 23, 1993 abandoned.

BACKGROUND OF THE INVENTION

1. Field of the Invention

The present invention relates to the structure of a camera body of the type in which a film cartridge is mainly used and more particularly to an arrangement for driving a force transmitting mechanism in the camera.

2. Description of the Related Arts

There has been conventionally known a camera employing a cartridge type film, which is so constructed that the film can be taken in and out without opening or closing a back cover. In this type of camera, the film cartridge is taken in and out in the direction of its shaft, by opening and closing a lid positioned on the bottom of the camera body.

For one model of camera similarly using a cartridge type film, there has been proposed a camera provided with a device for recording photographic information on a rear surface of an exposed film by magnetic means. In such a camera, the device for recording information is usually disposed behind a film feeding path.

In the above-mentioned camera, the back cover is not opened or closed. Therefore, it becomes possible to use a space between the film feeding path and the back cover freely, which is large in two dimensions. In the camera having the device for recording information, an extra space is inevitably formed between the film feeding path and the back cover. Such an extra space, however, should be reduced in order to make the camera body compact. Meanwhile, in arranging a driving force transmitting mechanism or the like, it is desirable to use restricted space within the camera body efficiently.

SUMMARY OF THE INVENTION

Therefore, an object of the present invention is to provide a camera allowing a film to be taken in and out without opening or closing a back cover and whose inside space is used efficiently by disposing a driving force transmitting mechanism behind a film feeding path, for satisfying the above-mentioned requirements.

In order to achieve the above object, according to the present invention, there is provided a camera having a cartridge chamber for loading a film cartridge and a spool chamber for storing a film fed therefrom and allowing the film cartridge to be taken in and out therefrom in a direction of its shaft. A drive transmission mechanism for driving an actuator of the camera is disposed behind a film feeding path through which film is fed from the cartridge chamber at the to the spool chamber, inside rear surface of the camera body.

DESCRIPTION OF THE PREFERRED EMBODIMENT

Figure 1:
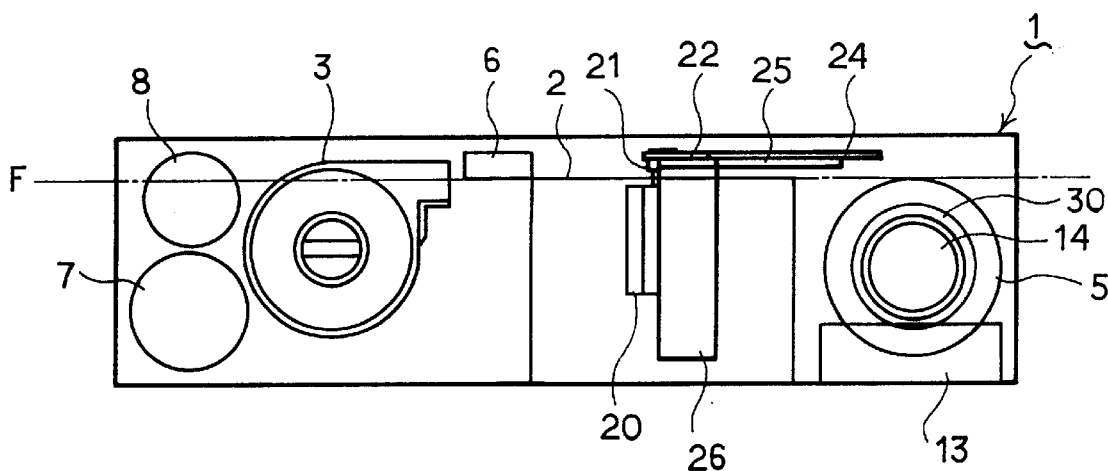
FIG. 1 is a schematic structural top view showing a camera in the first embodiment of the present invention.
Figure 2:
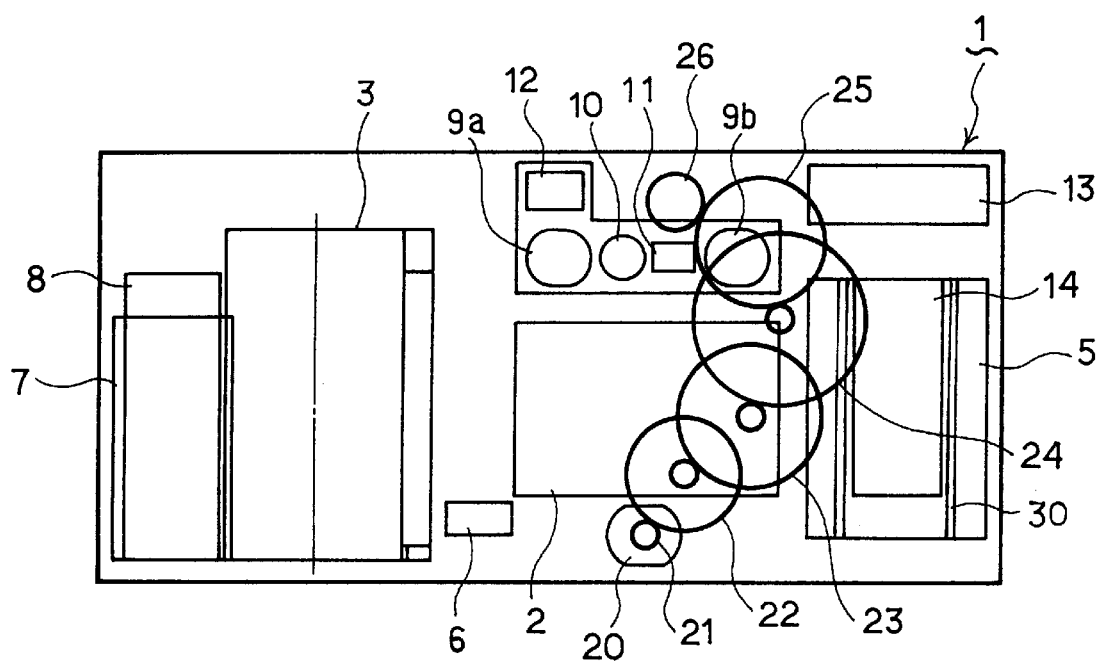
FIG. 2 is a front view showing the same.

A preferred embodiment of the present invention will now be described with reference to the drawings. The illustrated embodiments to a pre-wind type camera wherein photographing is started after previously winding a film up to a spool chamber. FIGS. 1 and 2 are schematic structural top and front view showing a camera of the first embodiment. An exposure aperture 2, through which light flux from an object to be photographed is projected to a film, is provided in approximately the center of a camera body 1. A cartridge chamber (not shown in the drawings) for loading a film cartridge 3 is provided on the left side of the exposure aperture 2, and a spool chamber 5 in which the film is wound up around a spool shaft 30 is provided on the right side, as shown in the drawings.

Further, a magnetic head 6 for recording or reading information, which contacts a rear surface of an exposed plane of the film, is provided behind a film feeding path between the exposure aperture 2 and the cartridge chamber. A battery 7 and a capacitor 8 for flash illumination are provided opposite the cartridge chamber across the exposure aperture 2. On upper side of the exposure aperture 2, an illuminating unit 9a of a distance measuring section for auto-focusing, a light detecting section 10 for auto-exposing, a viewfinder objective lens 11 and a light-receiving unit 9b of the distance measuring section are provided in order from the cartridge chamber side. A viewfinder eye piece 12 is provided on the upper backside of the illuminating unit 9a. Further, a flash 13 is provided above the spool chamber 5, and a motor 14 for winding the film is mounted in the spool shaft 30.

Furthermore, a motor 20 is provided under the exposure aperture 2. The motor 20 is used for a zooming drive of a viewfinder over the exposure aperture 2. An output shaft of the motor 20 is directed toward the rear of the camera, and a transmitting mechanism for transmitting a driving force is provided behind a film leading path plane (hereinafter referred to as the film plane) F extending from the cartridge chamber to the spool chamber 5, at the inside rear surface of the camera body. The transmitting mechanism meshes in the order of an output gear 21 of the output shaft from the motor 20, a stepped gear 22, a stepped gear 23, a stepped gear 24, a flat gear 25 and a gear of a cam 26 for zooming a viewfinder, so that the transmitting mechanism transmits the driving force in a vertical direction. The cam 26 for zooming a viewfinder is a spiral finder cam which can move a viewfinder lens.

Figure 3:
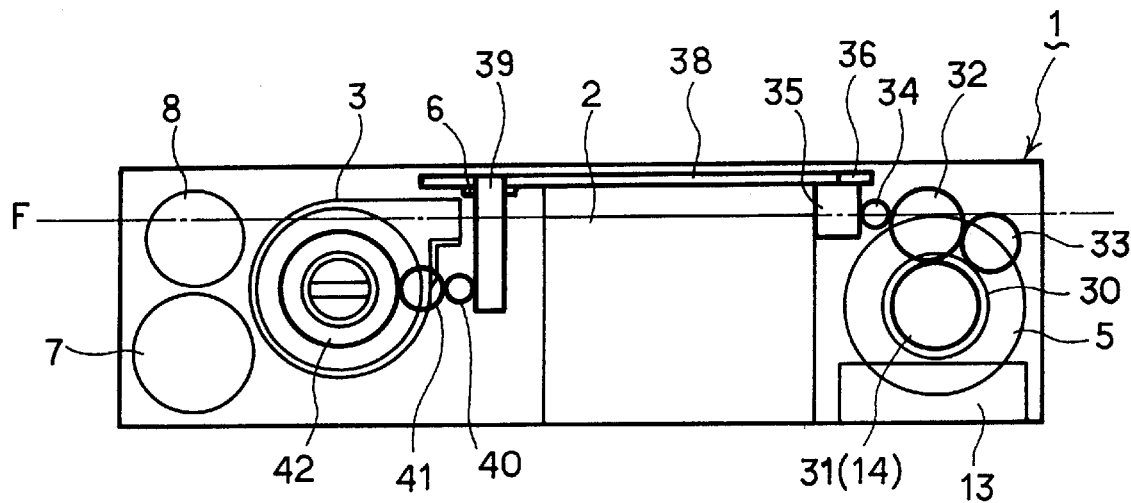
FIG. 3 is a schematic structural top view showing a camera in the second embodiment of the present invention.
Figure 4:
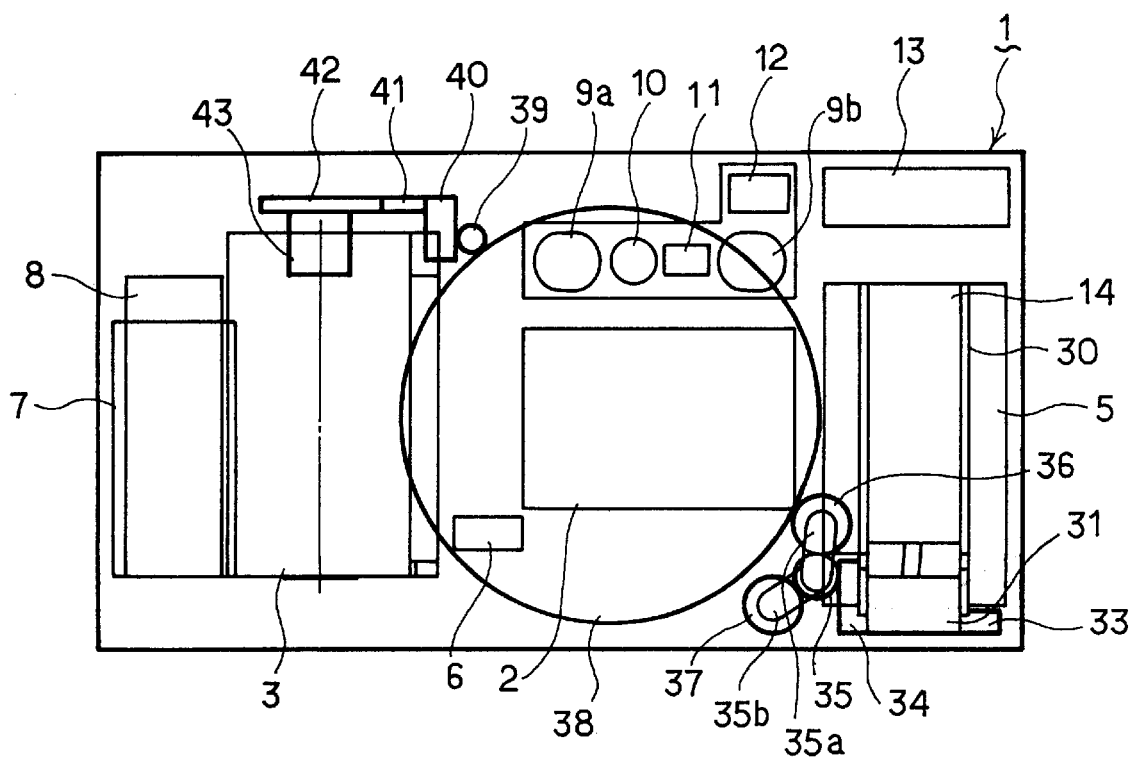
FIG. 4 is a front view showing the same.
Figure 5:
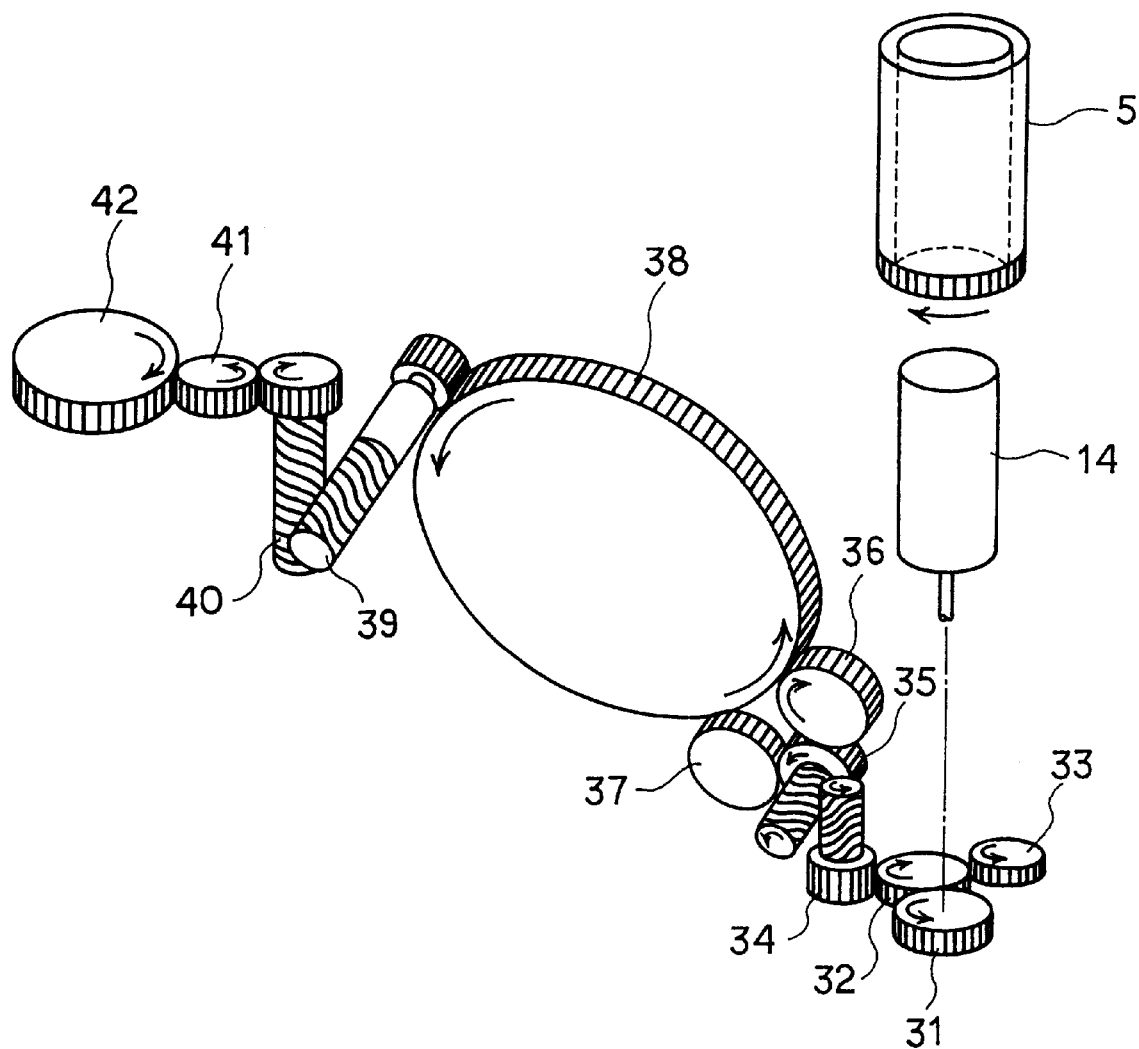
FIG. 5 is a perspective view showing a transmitting mechanism of the second embodiment.

A second embodiment of the present invention will now be described with reference to the drawings. FIGS. 3 and 4 are schematic structural views respectively from the top and the front of a camera of the second embodiment. FIG. 5 is a perspective view showing a transmitting mechanism. The relation of a cartridge chamber and a spool chamber to an exposure aperture 2 and a magnetic head 6 is arranged in a manner similar to the first embodiment.

A transmitting mechanism for transmitting a driving force to feed out or rewind the film is provided in the space between the film plane F and a rear surface of the camera, behind a film plane F. A motor 14 which is a driving source of the driving force transmitting mechanism is mounted in the spool shaft 30, and an output shaft of the motor 14 is directed downwardly of the camera. The driving force transmitting mechanism comprises, in order, a meshing arrangement of an output gear 31, a flat toothed gear and a screw toothed gear 34, a screw toothed gear and a sun gear 35, a planetary gear 36, 37, an idle gear 38, a flat toothed gear and a screw toothed gear 39, a screw toothed gear and a flat toothed gear 40, gear 41, and a fork gear 42 from the output shaft of the motor 14. Although a speed reduction system is provided in the driving force transmitting mechanism, it is omitted here for the purpose of simplification. By the above mesh arrangement, a structure for transmitting the driving force in a lateral and longitudinal direction is provided in the mechanism.

An output of the motor 14 meshes with a gear set in the spool shaft 30 through a flat gear 32 and 33, so that the motor 14 can also drive the spool shaft 30. A fork 43 which engages with a fork receiving set in the head of a cartridge 3 is provided on a fork gear 42. When engaged, they can feed out a film when the film is loaded, and can rewind the film after photographing.

Next, the movement of feeding out and rewinding the film will be explained. When the motor 14 rotates, the output gear 31 rotates, and the screw toothed gear 34 being integral with a gear which meshes with the rotated output gear 31 rotates. And the sun gear 35 being integral with a screw toothed gear which meshes with the screw toothed gear 34 rotates. Now, when the film is fed out from the film cartridge 3 loaded in the cartridge chamber, the sun gear 35 turns counterclockwise in FIG. 5 and carriers 35a and 35b which support the planetary gear 36 and 37 respectively also turn counterclockwise by friction. Turning counterclockwise separates the planet 37 from the idle gear 38, and the planetary 36 meshes with the idle gear 38. Accordingly, the idle gear 38 rotates in accordance with the rotation of the planetary gear 36, the rotation is transferred to the fork gear 42 through the screw toothed gears 39, 40 and gear 41, and then the film is fed out.

When the film is fed out from the film cartridge 3 and a leading edge of the film winds around the spool shaft 30, the film is fed out by the fork gear 42 and pulled by the spool shaft 30. At this time it is arranged that the velocity of the film pulled by the spool shaft 30 is faster than the velocity of the film fed out by the fork gear 42. Accordingly, the fork gear 42 is turned by the film. The rotation of the fork gear 42 transmits to the idle gear 38, and then the idle gear 38 flicks the planetary gear 36 which is to be in mesh, whereby the difference of rotational velocity between the spool shaft 30 and the fork gear 42 is absorbed.

When the film is rewound from the spool chamber 5 to the cartridge chamber, motor 14 rotates in the opposite direction to that above-mentioned. Accordingly, the toothed gear and the screw gear 34 rotate in the opposite direction, and the screw gear and the sun gear 35 turn clockwise. Turning clockwise separates the planetary gear 36 from the idle gear 38, and the planetary gear 37 meshes with the idle gear 38. Then, rotation in the opposite direction to that of winding is transmitted to the fork gear 42 through the idle gear 38, the screw gear 39 and 40, and the film is rewound. At that time, as the spool shaft 30 rotates faster than the rewinding film speed, the film is rewound loosely in the spool chamber 5.

As mentioned above, the first embodiment shows that the driving force transmitting mechanism of the motor 20 for zooming the viewfinder is provided in the space between the film plane F and the rear surface of the camera body 1 behind the film plane F, while the second embodiment shows that the driving force transmitting mechanism of the motor 14 for feeding the film is provided in the same space. The driving force transmitting mechanism can be arranged in the above-mentioned space covering all of a front projection space. Consequently, as the present invention can use the larger area and a gear with a longer radius, the number of parts composing the transmitting mechanism can be reduced and a transmitting efficiency is improved. Besides, a driving force can be transmitted everywhere in the camera body 1.

In a camera having a lid for opening and closing the film cartridge chamber, in which the lid is so designed that the film cartridge 3 is loaded into the film cartridge chamber in a direction along a longitudinal direction of the film cartridge 3 when the lid is open, and a fork 43 for driving the cartridge 3 is arranged in the upper section and the driving source is arranged in the lower section, it is necessary to transmit the driving force to the upper section. According to the present invention, this objective is easily achieved.

According to the present invention, as described in the foregoing, the driving transmitting mechanism is arranged behind the film plane, namely, in the space between the film plane and the rear surface of the camera body. This arrangement allows an efficient use of the space behind the film plane and contributes to a miniaturization of the camera body. Further, since a space behind the film plane can be used effectively, parts with a long radius become available, which is advantageous in the improvement of transmitting efficiency of the driving power as well as in the reduction of the number of parts. Further, transmission of the driving power to every section of the camera is facilitated.

The present invention is not restrictive within the above-mentioned embodiment structure, but many variations are possible. For example, in the above-mentioned embodiment, although the head 6 for recording or reading information is in the camera body 1, the present invention includes a camera in which the head 6 is not provided. The present invention can be applied to a normal wind-up type camera similarly to the above-described pre-wind type camera. Furthermore, the present invention can be also applied to a device in which an arrangement of the cartridge chamber and the spool chamber is reversed across the exposure aperture 2.

What is claimed is:

1. A camera of the type in which a film is advanced by one frame along a path for feeding a film between exposure of successive frames of the film, comprising:

a driving power source disposed on the front side of said film feeding path, that is closer to an object to be photographed, for providing a mechanical driving force; and a driving force transmitting mechanism provided immediately behind the film feeding path, for mechanically transmitting the driving force without exerting the driving force on film in the film feeding path, at the time of advancing the film by one frame between exposure of successive frames of the film or during driving of a lens, from said source to a destination mechanism which is not located immediately behind the film feeding path and is used for operating the camera.

2. A camera as claimed in claim 1 further comprising:

means, provided behind the film feeding path, for recording information onto a rear surface of the film.

3. A camera as claimed in claim 1, wherein said transmitting mechanism transmits the driving force in a lateral direction, parallel to the direction of movement of the film along said path.

4. A camera as claimed in claim 1, wherein said transmitting mechanism transmits the driving force in a vertical direction, transverse to the direction of movement of the film along said path.

5. The camera of claim 1 wherein said transmitting mechanism includes a gear train.

6. The camera of claim 1 wherein said mechanism which is used for operating the camera is disposed on said side of said film feeding path which is closer to an object to be photographed.

7. The camera of claim 1 wherein said driving force transmitting mechanism includes a gear.

8. A camera comprising:
   a body having an exposure aperture through which light flux from an object to be photographed is projected onto a film, and in which the film fed out from a film cartridge loaded into said body is advanced by one frame behind said exposure aperture between exposure of successive frames of the film;
   a driving power source disposed on the front side of said exposure aperture, which is closer to an object to be photographed, for providing a mechanical driving force; and
   a driving force transmitting mechanism provided immediately behind the exposure aperture, for mechanically transmitting the driving force, at the time of advancing the film by one frame between exposure of successive frames of the film or during driving of a lens, from said source to a destination mechanism which is located away from the back of the exposure aperture and is used for operating the camera.

9. A camera as claimed in claim 8 further comprising:
   means, provided behind the exposure aperture, for recording information onto a rear surface of the film.

10. The camera of claim 8 wherein said transmitting mechanism includes a gear train.

11. The camera of claim 8 wherein said mechanism which is used for operating the camera is disposed in front of said exposure aperture.

12. The camera of claim 8 wherein said driving force transmitting mechanism includes a gear.

13. A camera of the type in which a film is advanced by one frame along a path for feeding a film between exposure of successive frames of the film, comprising:
    a film cartridge chamber from which the film is fed, said chamber being disposed in the camera such that the center thereof is located on the front side of said film feeding path that is closest to an object to be photographed;
    a spool chamber for receiving the film, said spool chamber being disposed in the camera such that the center thereof is located on said front side of said film feeding path; and
    a driving force transmitting mechanism provided on the opposite side of said film feeding path from said chambers, for mechanically transmitting a mechanical driving force into at least one of said chambers for operating the camera at the time of advancing the film by one frame between exposure of successive frames of the film or during driving of a lens.

14. The camera of claim 13 further including a driving force source, which is disposed in front of said film feeding path.

15. The camera of claim 14 wherein said driving force source is a motor.

16. The camera of claim 13 wherein said transmitting mechanism includes a gear train.

17. The camera of claim 13 wherein said driving force transmitting mechanism transmits said driving force from one lateral side of an exposure aperture of the camera to the other side thereof.

18. The camera of claim 13 wherein said driving force transmitting mechanism includes a gear.

19. A camera having an exposure aperture through which light flux from an object to be photographed is projected onto a film, and in which the film is advanced by one frame behind said exposure aperture between exposure of successive frames of the film, comprising:
    a film cartridge chamber from which the film is fed, said chamber being disposed in the camera such that the center thereof is located on the front side of said exposure aperture which is closer to an object to be photographed;
    a spool chamber for receiving the film, said spool chamber being disposed in the camera such that the center thereof is located on said front side of said exposure aperture; and
    a driving force transmitting mechanism provided behind said exposure aperture on the opposite side thereof from said chambers, for mechanically transmitting a mechanical driving force into at least one of said chambers for operating the camera at the time of advancing the film by one frame between exposure of successive frames of the film or during driving of a lens.

20. The camera of claim 19 wherein said transmitting mechanism includes a gear train.

21. The camera of claim 19 wherein said driving force transmitting mechanism transmits said driving force from one lateral side of said exposure aperture to the other side thereof.

22. The camera of claim 19 further including a driving force source, which is disposed in front of said exposure aperture.

23. The camera of claim 22 wherein said driving force source is a motor.

24. The camera of claim 19 wherein said driving force transmitting mechanism includes a gear.

25. A camera having a predetermined image plane on which an image formed by a photographic lens is projected, comprising:
    a driving power source disposed on the side of said image plane which is closer to an object to be photographed, for providing a mechanical driving force;
    a driven mechanism disposed on said side of said image plane; and
    a driving force transmitting mechanism provided on the opposite side of the image plane immediately behind the location at which an image is formed, for mechanically transmitting the driving force from said source to said driven mechanism.

26. A camera having a predetermined image plane at which a subject image is formed, comprising:
    a driving power source disposed on one lateral side of an exposure aperture, for providing a mechanical driving force;
    a driven mechanism disposed on an opposite lateral side of said exposure aperture; and
    a driving force transmitting mechanism which passes immediately behind the exposure aperture, for mechanically transmitting the driving force from said source to said driven mechanism.

27. A camera as claimed in claim 26, wherein said driven mechanism is a film transport mechanism.

28. A camera having a path for feeding a film therethrough and an exposure aperture, comprising:
    a film cartridge chamber from which the film is fed, said chamber being disposed in the camera such that the center thereof is located in front of said film feeding path;
    a spool chamber for receiving the film, said spool chamber being disposed in the camera such that the center thereof is located in front of said film feeding path; and a driving force transmitting mechanism provided behind said film feeding path, for mechanically transmitting a mechanical driving force into at least one of said chambers for operating the camera, from one lateral side of said exposure aperture of the camera to the other side thereof at the time of feeding one frame of film or during driving of a lens.

29. A camera having an exposure aperture through which light flux from an object to be photographed is projected onto a film, comprising:

- a film cartridge chamber from which the film is fed, said chamber being disposed in the camera such that the center thereof is located in front of said exposure aperture;
- a spool chamber for receiving the film, said spool chamber being disposed in the camera such that the center thereof is located in front of said exposure aperture; and
- a driving force transmitting mechanism provided behind said exposure aperture, for mechanically transmitting a mechanical driving force into at least one of said chambers for operating the camera, from one lateral side of said exposure aperture to the other side thereof at the time of feeding one frame of film or during driving of a lens.

30. A camera having an exposure aperture through which light flux from an object to be photographed is projected onto a film, comprising:

- a motor disposed on a lower side of said exposure aperture, for providing a mechanical driving force from a lower side of the camera;
- a viewfinder mechanism disposed on an upper side of said camera, relative to said exposure aperture; and
- a driving force transmitting mechanism provided immediately behind the exposure aperture, for mechanically transmitting the driving force from said motor to said viewfinder mechanism.

* * * * *